United States Patent [19]

Mendelsohn et al.

[11] 4,134,883
[45] Jan. 16, 1979

[54] ABRASION RESISTANT POLYURETHANE ARTICLE HAVING A HIGH ROLLING COEFFICIENT OF FRICTION

[75] Inventors: Morris A. Mendelsohn, Wilkins Township, Allegheny County; Carl P. Izzo, Penn Hills Township, Allegheny County, both of Pa.

[73] Assignee: Westinghouse Electric Corp., Pittsburgh, Pa.

[21] Appl. No.: 827,033

[22] Filed: Aug. 23, 1977

[51] Int. Cl.$^2$ .................... C08G 18/48; C08G 18/32
[52] U.S. Cl. .................................. 528/63; 198/335; 198/835; 428/425
[58] Field of Search .............................. 198/335, 835; 260/77.5 AM; 428/425

[56] References Cited

U.S. PATENT DOCUMENTS

| | | | |
|---|---|---|---|
| 3,034,791 | 5/1962 | Gallagher | 260/77.5 AM |
| 3,414,109 | 12/1963 | Clark | 198/18 |
| 3,490,119 | 1/1970 | Fukuyama et al. | 29/132 |
| 3,779,360 | 12/1973 | El Taher | 198/16 R |
| 4,005,773 | 2/1977 | Bouille | 198/335 |
| 4,010,146 | 3/1977 | Russell et al. | 260/77.5 AM |

*Primary Examiner*—M. J. Welsh
*Attorney, Agent, or Firm*—D. P. Cillo

[57] ABSTRACT

An abrasion resistant traction article is made, comprising a cured, high traction, extended polyurethane composition, comprising the cured reaction product of: (1) 100 parts of a prepolymer made from polyoxytetramethylenediol, polyoxyisopropylenediol and tolylene diisocyanate and (2) 8.0 parts to 10.0 parts of methylene bis(o-chloroaniline), acting as a chain extender.

11 Claims, 3 Drawing Figures

ABRASION RESISTANT POLYURETHANE ARTICLE HAVING A HIGH ROLLING COEFFICIENT OF FRICTION

BACKGROUND OF THE INVENTION

Passenger transportation devices, such as escalators, having a moving passenger stairway and handrail, are well known in the art. The handrail drive assemblies for such escalators usually consist of a traction roller, composed of an elastomer material such as rubber or polyurethane, as taught by Clark, in U.S. Pat. No. 3,414,109, and Taher et al, in U.S. Pat. No. 3,779,360.

The major problem associated with such driving rollers, is finding a materials composition that will provide both high strength in terms of high abrasion resistance, and a high coefficient of friction, to provide good traction through the driving wheel to move the handrail.

Fukuyama et al, in U.S. Pat. No. 3,490,119, attempted to solve these problems by providing a rubber roll, comprising a metal core, covered with a thermoset resin impregnated fiber layer, and having an outer, cast rubber layer of abrasion trimmed 20 millimeter thick polyurethane. The polyurethane consisted of the reaction product of 12 parts of methylene bis(O-chloroaniline) per 100 parts of a polyoxytetramethylene containing polyurethane prepolymer. This materials composition would provide an outer roller surface having good strength and wear resistance but only moderately good traction properties even after abrasion treatment, i.e. rolling coefficients of friction, in the probably range of about 0.50 to 0.85. What is needed is an abrasion resistant, higher traction roller, which can be used to drive escalator handrails, or any other movable plastic, rubber or metal belt.

SUMMARY OF THE INVENTION

The above problems have been solved, and the above needs met, by providing an abrasion resistant, high traction article, usually in the form of a sheet or roller, having a rolling coefficient of friction of over about 0.90 and a Shore A hardness of about 78 to 84, useful, in one embodiment, to move any type of flat or curved belt surface. The roller comprises a hub, usually made of metal, covered with a cured, abrasion resistant, high traction, extended polyurethane composition, made from specific ingredients reacted in critical weight ratios. The polyurethane coating of this invention is castable, and consists essentially of the reaction product of an isocyanate with a diol mixture, consisting essentially of about 60 weight percent to about 85 weight percent of polyoxytetramethylene, and about 15 weight percent to about 40 weight percent of polyoxyisopropylene. To 100 parts of this diol mixture, about 14 to about 17 parts of tolylene diisocyanate is added, to form the prepolymer. To 100 parts by weight of this prepolymer, which has an isocyanate equivalent weight of about 1,350 to about 1,600, is added from 8.0 parts to 10.0 parts by weight of methylene bis(o-chloroaniline), as a chain extender, to form an extended, fluid, polyurethane casting composition.

Generally, a metal wheel hub is treated on its circumferential surface with an adhesion promoting primer, inserted into a wheel mold, and heated. The reactive solution of extended polyurethane is poured around the circumference of the hub in the mold, to form an outer tire. After about 1 to 3 hours at about 80° C. to about 100° C., the roller, with its cast, cured polyurethane tire, is removed and postcured. The polyurethane wheel will generally have a hardness of about 78 to 84 Shore A, and a high traction, i.e., a rolling coefficient of friction of about over 0.90, and generally between about 1.10 to about 1.60, without any substantial abrasion treatment. These properties make it particularly useful as the driving traction roller for escalator handrails, or other movable plastic, rubber or metal articles or belts. It can also be disposed against rotating wheels while attached to various speed monitoring instruments or equipment. For example, one end of the roller can be attached to an elevator pulley, and the other end to a tachometer which would indicate the position of an elevator.

BRIEF DESCRIPTION OF THE DRAWINGS

For a better understanding of the invention, reference may be made to the preferred embodiment, exemplary of the invention, shown in the accompanying drawings, in which.

DESCRIPTION OF THE PREFERRED EMBODIMENTS

Figure 1:
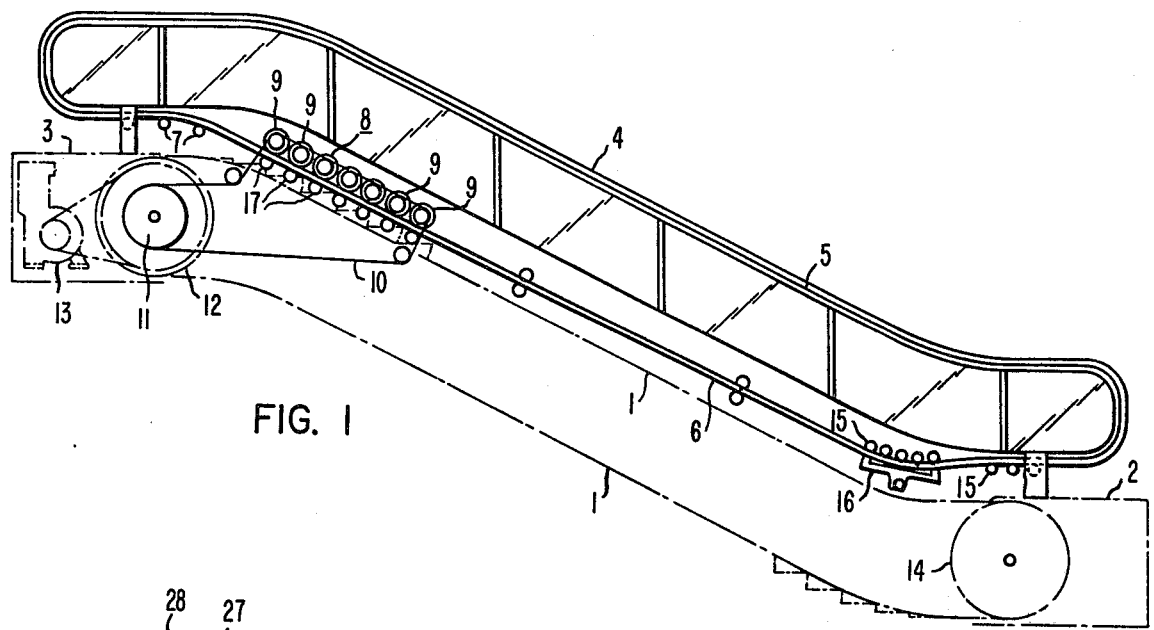
FIG. 1 is a schematic view, in side elevation, of one type of an escalator employing a handrail drive unit utilizing the polyurethane rollers of this invention.

Referring now to the drawings, the invention will be described as used in an escalator handrail drive unit, but it is to be understood, that the roller of this invention is not so limited, and has many other useful applications. FIG. 1 shows a passenger transportation device, using a moving stairway 1, for moving passengers between a first landing 2 and a second landing 3, along with a guiding handrail 4 to be grasped by passengers as they are transported along the stairway 1. The stairway may be of the endless type generally employed in conventional escalators.

The handrail has an upper run, as at 5 and a lower return run, as at 6. The return run of the handrail is guided by idler rollers 7 and passes between a plurality of pairs of rollers which drive the handrail. This handrail drive unit 8 may comprise from about five to fifteen pairs of traction drive rollers 9. Each of the traction rollers 9, is driven through a sprocket wheel, shown as 26 in FIG. 2, coupled by a sprocket chain 10 to a driving sprocket wheel 11, mounted for rotataion with the main sprocket wheel 12, rotated by an electric motor 13, through a suitable driving mechanism. Also shown in FIG. 1 are lower sprocket wheel 14, idler rollers 15 which may be provided with an adjustment 16 for taking up excessive slack in the handrail, and pressure rollers 17, opposite the drive rollers 9.

Figure 2:
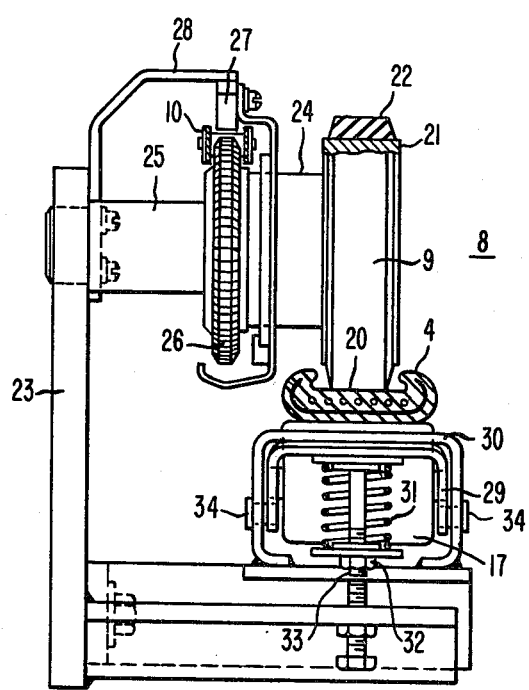
FIG. 2 is a detailed view, in end elevation, of the drive unit employing the polyurethane rollers of this invention.

A detailed view of the handrail drive unit 8, is shown in FIG. 2. Since each traction drive roller 9 and pressure roller 17 is of similar construction, a detailed description of only one pair, with their associated linkage, will be given. A more complete description of this type escalator assembly can be found in U.S. Pat. No. 3,414,109, herein incorporated by reference.

As shown in FIG. 2, a traction drive roller 9 is mounted for rotation about an axis transverse to the direction of movement of the handrail 4. The drive roller 9 projects within the C-shaped cross section of the handrail, to contact the inner surface of the handrail at 20. It is at this point, where a high coefficient of friction is required of the drive roller tire 22, to efficiently move the handrail.

The handrail may be of conventional construction, such as rubber reinforced with materials such as cotton fabric, canvas, steel ribbon or steel wires. It is generally constructed as an elongated strip, whose ends are spliced and vulcanized to produce an endless or closed loop. The traction drive roller 9 may be constructed of a rigid hub 21, such as steel or aluminum alloy, covered by a high friction outer tire 22, which in this invention is a special, extended, high traction polyurethane composition.

The pressure roller 17, shown partially hidden behind its associated spring assembly, is opposite the traction drive roller, may have the same construction as the drive roller 9, and is mounted for rotation about an axis parallel to the axis of the drive roller. The pressure rollers engage the outer surface of the handrail to push the handrail toward the drive rollers, so that good traction contact is maintained at 20. The drive rollers 9 may be mounted on a plate 23, which may be secured to the supporting structure or truss of the conveyor in any suitable manner.

The drive roller has its hub 21, releasably secured to a steel sleeve 24 which rotates on a stub shaft 25. The stub shaft is releasably secured to the plate 23 as by a screw-threaded connection. Preferably the sleeve is mounted for rotation relative to the stub shaft by means of conventional ball or roller bearings.

Each of the drive rollers is positively driven through a sprocket wheel 26 concentric with and secured to the sleeve 24. The sprocket wheels of the drive rollers are coupled by a sprocket chain 10 to a sprocket wheel mounted for rotation with the main sprocket wheel. Guide bar 27 is located slightly above the desired path of the sprocket chain as it passes over the sprocket wheels. The guide bar is constructed of material having low friction such as steel. The guide bar is held in position above the sprocket chain by means of brackets 28 which are secured to the guide bar and to the plate 23 in any suitable manner such as by machine screws.

The pressure rollers 17 are connected to a subframe 29, mounted in a cage 30 having two vertical side walls and connected to an upper wall. Also shown are coil spring 31 compressed by nut 32 in threaded engagement with stud 33. When the cage 30 is moved upwardly to compress the handrail 4 between the drive roller 9 and the pressure roller 17, each of the pressure rollers can pivot its subframe 29 about the pins 34 to further compress the coil spring 31.

The polyurethane tire 22, used to cover the hub 21 of the driving wheels of this invention, is of a special composition. Reaction of an isocyanate and an alcohol results in the formation of a Urethane:

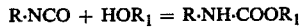

R·NCO + HOR$_1$ = R·NH·COOR$_1$

By the same reaction, polyhydroxyl materials will react with polyisocyanates to yield polyurethanes. These polyurethanes are well known in the art, and a detailed description of their synthesis can be found in *Plastics Materials*, by J. A. Brydson, 1966, pp. 484–504.

In this invention, a prepolymer is first formed from a diol admixture and an isocyanate, added in critical proportions. The diol admixture consists essentially of about 60 weight percent to about 85 weight percent of polyoxytetramethylene (PTM), a diol having a molecular weight of about 2,000; and about 15 weight percent to about 40 weight percent of polyoxyisopropylene (PIP), a diol having a molecular weight of about 2,000. Use of the ingredients outside of this range generally results in lowering the rolling coefficient of friction below about 0.90, providing less traction for the roller. Use of other diols have not provided the roller qualities required.

One hundred parts of this diol mixture is slowly added to between about 14 to about 17 parts of tolylene diisocyanate, at rising temperatures up to 90° C., in an inert atmosphere, generally under dry nitrogen gas to form a prepolymer having an isocyanate equivalent weight of about 1,350 to about 1,600. Isocyanate equivalent weights below about 1,350 will generally provide rolling coefficients of friction below 0.90.

The particular isocyanate described above provides the optimum combination of abrasion resistance and rolling coefficient of friction and is meant to include various toluene diisocyanate types, generally 2,4-toluene diisocyanate; 2,6-toluene diisocyanate and mixtures thereof, and particularly, a 80:20 wt.% mixture of 2,4-toluene diisocyanate:toluene 2,6-tolylene diisocyanate. Use of other types of isocyanate materials will generally result in either low rolling coefficients of friction or low abrasion resistance properties. A small amount of benzoyl chloride, generally about 0.05 part to about 0.15 part per 100 parts diol, is added to effectively stabilize the polymer. To 100 parts by weight of this prepolymer is added 8.0 parts to 10.0 parts by weight of methylene bis(O-chloraniline) (MOCA), functioning as a chain extender to form the reactive, polyurethane composition of this invention. The chain extender is a polyfunctional coreactant which on reaction with the other component(s) gives the high molecular weight polymer.

Generally, a hub, usually a cast aluminum alloy, is treated with a suitable adhesion promoting primer, as is well known in the art, inserted into a suitable wheel mold, and heated to about 80° C. to about 100° C. The reactive solution of extended polyurethane, heated to between about 90° C. to about 130° C., is poured around the outer circumference of the hub in the wheel mold, to form an outer tire. After about 1 to 3 hours, at about 80° C. to about 100° C., the roller, with its cast polyurethane tire, is removed, placed in an oven, and further heated for about 16 hours, at about 80° C. to about 100° C., to completely cure the polymer.

The polyurethane wheel is then treated to remove the microlayers of teflon or other mold release agent used, or any other surface contaminants contained on its circumferential surface. In one micro-cleaning method, the polyurethane wheel is given a very mild, 30 second to 90 second air-sandblast cleaning, and then wiped with water and finally with acetone or other suitable organic solvent. This air-pressure sand cleaning merely removes the contaminants, and does not appreciably roughen the roller wheel surface, which extra step would prove commercially uneconomical. The cleaning step removes approximately about 100 to 5,000 angstrom units of surface, and removal of such minor amounts of surface is herein defined as "micro-cleaning". Finally, the wheel is dried at about 50° C. for about 2 hours. This provides a polyurethane wheel that will have a hardness of about 78 to 84 Shore A, a rolling coefficient of friction of over 0.90 and generally between about 0.90 and about 1.60, and a Tabor weight loss of between about 0.0022 gram to about 0.0034 gram.

Figure 3:
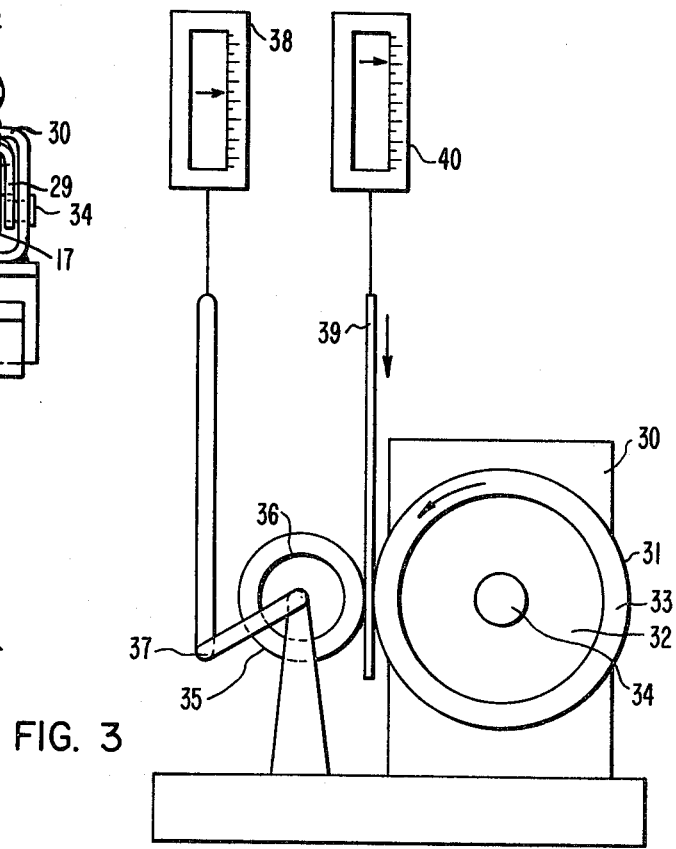
FIG. 3 is a schematic illustration of the apparatus used to test rolling coefficient of friction in the Examples.

Shore A hardness and Tabor weight loss values are standard and well known to those in the art. Rolling coefficient of friction measurements were conducted on a handrail drive roller tester (Westinghouse Elevator Division, model No. 7T-729-6) shown in FIG. 3. A ¼ hp. motor driving gear reduction unit 30 is shown, and drives the traction test roller 31, comprising a hub 32, a high traction extended polyurethane wheel 33 covering the outer circumference of the hub, and a shaft 34 connected to the motor. Opposite the test roller 31, is a load roller 35, having a polyurethane wheel 36, which is adjusted through tension linkage 37 and a Chatillon Type 160 spring balance 38 to apply a load of 120 lb. to a stainless steel plate 39, in contact with the test roller 31. The scale 38 reading will be 60 lb., however, due to the 2 to 1 mechanical advantage of the lever mechanism. A Chatillon Type 160, 300 lb. capacity spring balance 40 measures the tractive force, as the test roller 31 rotates counterclockwise through a 40° angle. Thus, 9 readings are taken per single rotation of the test roller. The rolling coefficient of friction is measured by dividing the tractive force shown on balance 40 after each test by 120. After each test, plate 39 is cleaned with acetone. Any reference to rolling coefficient of friction in this specification will be defined as that measured on this Westinghouse handrail drive roller tester or a similar device, under the conditions described above.

EXAMPLE 1

A series of polyurethane drive rollers were prepared by the following method. A prepolymer batch was made by mixing two polyols and a diisocyanate. Toluene diisocyanate, 154 grams, consisting of an isomeric mixture of 80 weight percent of 2,4-toluene diisocyanate and 20 weight percent of 2,6-toluene diisocyanate, was placed into a flask under a dry nitrogen atmosphere.

A diol admixture, consisting of 300 grams of polyoxyisopropylene diol (PIP), having a molecular weight of about 2,000, and 700 grams of polyoxytetramethylene diol (PTM), having a molecular weight of about 2,000, was made and slowly added to the diisocyanate, over about 1 hour, with stirring. Throughout the entire reaction period, the composition was stirred and dry nitrogen slowly passed through the reaction flask in order to maintain an inert atmosphere. During the addition of the diol admixture, the temperature was slowly increased from 25° C. to about 65° C., and then finally to about 80° C., and held there for about 4 hours. Then, about 1.15 grams of benzoyl chloride was added to the reaction product to effectively stabilize the formed polyurethane prepolymer. The reaction product was split into samples, poured into containers and sealed. The percent isocyanate was about 2.8% to 3.0% and the isocyanate equivalent weight was about 1,450.

A mold was used to produce tires of about 4.25" inside diameter × 5.12" outside diameter × 1.5" width. A cast aluminum 4.25" outside diameter hub was brushed with a standard adhesion promoting primer (sold commercially as Chemlock 218 by Hughson Chem. Co.), inserted into the wheel mold and heated to 90° C. Then, to each 100 grams of the polyurethane prepolymer samples, which had been degassed and preheated to 90° C., was added 8.8 grams of methylene bis(O-chloroaniline) (MOCA), which had been heated to 125° C., and acts as a chain extender. The reactive solution sample was poured around the circumference of the metal hub in the mold. After about 1.5 hours at 90° C. in the mold, the consolidated, solid drive roller was removed from the mold, placed in an oven, and heated for 16 hours at 90° C., to completely cure the wheel.

After cooling to 25° C., the teflon release agent microlayer on the polyurethane tire was removed by a mild sandblasting operation. A Pangborn Corp. sandblast enclosure, with associated sandblast gun was used to sandblast-kiss the wheel. About 80 psi. air pressure was used 4" from the wheel, which was rotated 360°. The total sandblast time was 60 seconds. This quick air pressure-sand cleaning operation removed the microlayer of contaminants without appreciably roughening the wheel surface. The wheel was then wiped with household cleanser, rinsed with water, and wiped with an acetone wet cloth. After drying for about 3 hours in a 50° C. oven and 24 hours at room temperature, the sample wheels were tested. Sheets were also made from the above-described composition and cured at approximately the same times and temperatures, for weight loss and hardness testing. Results are given in Table 1 below:

TABLE 1

| Sample | Isocyanate Eq. Wt. | PIP: PTM | Prepolymer :MOCA | Hardness Shore A | Rolling Coef. Frict. | Tabor Wt. Loss (grams) |
|---|---|---|---|---|---|---|
| 1A | 1,450 | 30:70 | 100:8.8 | 83 | 1.11 | 0.0023 |
| 1B | 1,450 | 30:70 | 100:8.8 | 83 | 0.93 | 0.0023 |
| 1C | 1,450 | 30:70 | 100:8.8 | 83 | 0.98 | 0.0023 |
| 1D | 1,450 | 30:70 | 100:8.8 | 83 | 0.93 | 0.0023 |
| 1E | 1,450 | 30:70 | 100:8.8 | 82 | 1.08 | 0.0023 |
| 1F | 1,450 | 30:70 | 100:8.8 | 83 | 0.96 | 0.0023 |
| 1G | 1,450 | 30:70 | 100:8.8 | 85 | 1.10 | 0.0023 |
| 1H | 1,450 | 30:70 | 100:8.8 | 85 | 1.14 | 0.0023 |
| 1I | 1,450 | 30:70 | 100:8.8 | 84 | 0.96 | 0.0023 |
| 1J | 1,450 | 30:70 | 100:8.8 | 84 | 1.27 | 0.0023 |
| 1K | 1,450 | 30:70 | 100:8.8 | 85 | 1.14 | 0.0023 |
| 1L | 1,450 | 30:70 | 100:8.8 | 84 | 1.19 | 0.0023 |

These results show that Samples 1A though 1L would provide excellent traction escalator handrail rollers. A Taber Abrasion Tester Model 503 was used to determine Taber weight loss. Sheets of the extended polyurethane, sized to 4" × 4" × ⅛", having a 5/16" hole punched through the center, were placed on the turntable of the Taber apparatus. Two CS-10 wheels, each with a 1,000 g. weight rotated on the sheet while it was spinning on the turntable at 72 rpm. A vacuum attachment collected the abraded material and after 1,000 rotations the weight loss of the sheet was measured. Shore A hardness (scleroscope hardness test) was measured as rebound when a diamond pointed hammer dropped through a tube onto the sheet surface. Rolling coefficient of friction values were determined using the apparatus described hereinabove, and illustrated in FIG. 3 of the drawings.

EXAMPLE 2

A series of polyurethane drive rollers and sheets were prepared as comparative examples, using the same method and tested using the same procedures as in EXAMPLE 1, but using different ratios of PIP:PTM and prepolymer:MOCA. The sample wheels and sheets were tested. Results are given in TABLE 2 below:

TABLE 2

| Sample | Isocyanate Eq. Wt. | PIP :PTM | Prepolymer :MOCA | Hardness Shore A | Rolling Coef. Frict. |
|---|---|---|---|---|---|
| 2A | 1,300 | 0:100 | 100:10.8 | 83 | 0.86 |
| 2B | 1,300 | 0:100 | 100:10.5 | 83 | 0.73 |
| 2C | 670 | 0:100 | 100:19.0 | 95 | 0.28 |

These results show the importance of using both PIP and PTM diols, and using a low ratio of MOCA to prepolymer.

We claim:

1. An abrasion resistant, traction article, comprising a cured, high traction, extended polyurethane composition consisting essentially of the cured reaction product of:
   (1) 100 parts of an isocyanate terminated prepolymer consisting essentially of the reaction product of:
      (A) 100 parts of a diol admixture consisting of about 60 weight percent to about 85 weight percent of polyoxytetramethlenediol and about 15 weight percent to about 40 weight percent of polyoxyisopropylenediol, and
      (B) about 14 parts to about 17 parts of toluene diisocyanate, and
   (2) 8.0 parts to 10.0 parts of methylene bis(O-chloroaniline acting as a chain extender.

2. An abrasion resistant, traction roller, comprising a metal hub, the outer circumference of which is covered with a cured, abrasion resistant, high traction, extended polyurethane composition wheel consisting essentially of the cured reaction product of:
   (1) 100 parts of an isocyanate terminated prepolymer, having an isocyanate equivalent weight of between about 1,350 and about 1,600, consisting of the reaction product of:
      (A) 100 parts of a diol admixture consisting of about 60 weight percent to about 85 weight percent of polyoxytetramethylenediol and about 15 weight percent to about 40 weight percent of polyoxyisopropylenediol, and
      (B) about 14 parts to about 17 parts of toluene diisocyanate, and
   (2) 8.0 parts to 10.0 parts of methylene bis(O-chloroaniline) acting as a chain extender, said cured polyurethane composition characterized by a Shore A hardness of about 78 to 84.

3. The roller of claim 2, wherein the toluene diisocyanate is selected from the group consisting of 2,4-toluene diisocyanate; 2,6-toluene diisocyanate and mixtures thereof.

4. The roller of claim 2, wherein about 0.05 part to about 0.15 part of benzoyl chloride is added to 100 parts of (A).

5. The roller of claim 2, wherein the wheel is microcleaned.

6. The roller of claim 5, wherein the cured polyurethane composition is further characterized by a rolling coefficient of friction of over 0.90, and the toluene diisocyanate is a 80:20 wt.% mixture of 2,4-toluene diisocyanate:2,6-toluene diisocyanate.

7. The roller of claim 5, wherein the cured polyurethane composition is further characterized by a rolling coefficient of friction of between about 0.90 to about 1.60.

8. The roller of claim 5 wherein the wheel is cleaned by sand applied by air pressure.

9. The roller of claim 5 being a traction escalator handrail roller.

10. A method of making an abrasion resistant, high traction roller, comprising a metal hub, the outer circumference of which is covered with an abrasion resistant, high traction, extended polyurethane composition wheel, comprising the following steps:
    (1) mixing:
       (A) 100 parts of an isocyanate terminated prepolymer, having an isocyanate equivalent weight of between about 1,350 and 1,600, consisting essentially of the reaction product of:
          (i) 100 parts of a diol mixture consisting of about 60 weight percent to about 85 weight percent of polyoxytetramethylenediol and about 15 weight percent to about 40 weight percent of polyoxyisopropylenediol, and
          (ii) about 14 parts to about 17 parts of toluene diisocyanate, added in an inert atmosphere, and
       (B) 8.0 parts to 10.0 parts of methylene bis(O-chloroaniline) acting as a chain extender, to form an extended, reactive, fluid polyurethane composition,
    (2) inserting a metal wheel hub into a wheel mold,
    (3) pouring the extended polyurethane composition around the circumference of the metal hub in the mold,
    (4) heating the hub and the reactive polyurethane composition for about 1 hour to 3 hours, at about 80° C. to about 100° C., in the mold, to form a hub with a solid polyurethane tire around its circumference.

11. The article of claim 1, where the polyurethane composition is characterized by a Shore A hardness of about 78 to 84, and the prepolymer has an isocyanate equivalent weight of about 1,350 to about 1,600.

* * * * *